(12) United States Patent
Galvanauskas et al.

(10) Patent No.: US 7,190,511 B2
(45) Date of Patent: Mar. 13, 2007

(54) FIBER LASER SYSTEM WITH INCREASED OPTICAL DAMAGE THRESHOLD

(75) Inventors: Almantas Galvanauskas, Ann Arbor, MI (US); Donald J. Harter, Ann Arbor, MI (US); Martin E. Fermann, Ann Arbor, MI (US); Ferenc Raksi, Ann Arbor, MI (US)

(73) Assignee: IMRA America, Ann Arbor, MI (US)

( * ) Notice: Subject to any disclaimer, the term of this patent is extended or adjusted under 35 U.S.C. 154(b) by 0 days.

(21) Appl. No.: 11/339,679

(22) Filed: Jan. 26, 2006

(65) Prior Publication Data

US 2006/0132904 A1 Jun. 22, 2006

Related U.S. Application Data

(63) Continuation of application No. 11/141,704, filed on Jun. 1, 2005, and a continuation of application No. 09/317,221, filed on May 24, 1999, now abandoned, which is a continuation-in-part of application No. 09/116,241, filed on Jul. 16, 1998, now Pat. No. 6,208,458.

(51) Int. Cl.
*H01S 3/00* (2006.01)
*G02B 6/26* (2006.01)

(52) U.S. Cl. .......................... 359/341.1; 372/6; 385/28

(58) Field of Classification Search ............. 359/341.1; 372/6; 385/27, 28
See application file for complete search history.

(56) References Cited

U.S. PATENT DOCUMENTS

| | | | |
|---|---|---|---|
| 4,787,927 A | 11/1988 | Mears et al. | |
| 4,829,529 A | 5/1989 | Kafka | |
| 4,871,962 A | 10/1989 | Cheung | ...................... 324/682 |
| 4,922,182 A | 5/1990 | Cox | .......................... 324/682 |
| 5,187,759 A * | 2/1993 | DiGiovanni et al. | .......... 385/27 |
| 5,216,249 A | 6/1993 | Jones et al. | ............ 250/370.05 |
| 5,352,493 A | 10/1994 | Dorfman et al. | ............ 427/530 |

(Continued)

OTHER PUBLICATIONS

Technical Digest, Conference on Lasers and Electro-Optics; vol. 6, May 1998, "Frequency doubling of Er-doped multi-mode fiber compressor-amplifiers", M.E. Fermann et al.

(Continued)

*Primary Examiner*—Mark Hellner
(74) *Attorney, Agent, or Firm*—Sughrue Mion, PLLC

(57) ABSTRACT

The invention describes techniques for the control of the spatial as well as spectral beam quality of multi-mode fiber amplification of high peak power pulses as well as using such a configuration to replace the present diode-pumped, Neodynium based sources. Perfect spatial beam-quality can be ensured by exciting the fundamental mode in the multi-mode fibers with appropriate mode-matching optics and techniques. The loss of spatial beam-quality in the multi-mode fibers along the fiber length can be minimized by using multi-mode fibers with large cladding diameters. Near diffraction-limited coherent multi-mode amplifiers can be conveniently cladding pumped, allowing for the generation of high average power. Moreover, the polarization state in the multi-mode fiber amplifiers can be preserved by implementing multi-mode fibers with stress producing regions or elliptical fiber cores These lasers find application as a general replacement of Nd: based lasers, especially Nd:YAG lasers. Particularly utility is disclosed for applications in the marking, micro-machining and drilling areas.

28 Claims, 5 Drawing Sheets

U.S. PATENT DOCUMENTS

| | | | |
|---|---|---|---|
| 5,381,431 A | 1/1995 | Zayhowski | |
| 5,466,431 A | 11/1995 | Dorfman et al. | 423/446 |
| 5,488,619 A | 1/1996 | Injeyan et al. | |
| 5,517,525 A | 5/1996 | Endo et al. | |
| 5,627,848 A | 5/1997 | Fermann et al. | |
| 5,774,484 A | 6/1998 | Wyatt et al. | |
| 5,818,630 A | 10/1998 | Fermann et al. | |
| 5,861,970 A | 1/1999 | Tatham et al. | |
| 5,999,673 A | 12/1999 | Valentin et al. | |
| 6,031,849 A | 2/2000 | Ball et al. | |
| 6,034,975 A | 3/2000 | Harter et al. | |
| 6,080,470 A | 6/2000 | Dorfman | 428/216 |
| 6,081,369 A | 6/2000 | Waarts et al. | |
| 6,208,457 B1* | 3/2001 | Okuta et al. | 359/341.1 |
| 6,212,216 B1 | 4/2001 | Pillai | |
| 6,215,630 B1 | 4/2001 | Schultz et al. | 360/320 |
| 6,236,793 B1 | 5/2001 | Laurence et al. | |
| 6,275,512 B1 | 8/2001 | Fermann | |
| 6,315,956 B1 | 11/2001 | Foulger | 422/98 |
| 6,393,182 B1* | 5/2002 | Sakano | 385/38 |
| 6,452,564 B1 | 9/2002 | Schoen et al. | 343/872 |
| 6,465,351 B1 | 10/2002 | Jeong | 438/689 |
| 6,503,627 B1 | 1/2003 | Niimi et al. | 428/409 |
| 2002/0168139 A1 | 11/2002 | Clarkson et al. | |
| 2004/0213302 A1 | 10/2004 | Fermann et al. | |

OTHER PUBLICATIONS

Technical Digest, Conference on Lasers and Electro-Optics; vol. 6, May 1998, "High-energy high-average-power femtosecond fiber system using a QPM-grating pulse compressor", Galvanauskas, et al.

Technical Digest, Optical Fiber Communication Conference and Exhibit; vol. 2, Feb. 1998, "High-power single-mode fiber amplifiers using multimode fibers", M.E. Fermann, et al.

\* cited by examiner

Actively Q-switched micro-laser

Layout of the actively Q-switched microchip laser

Temporal profile of activety Q-switched DPSS

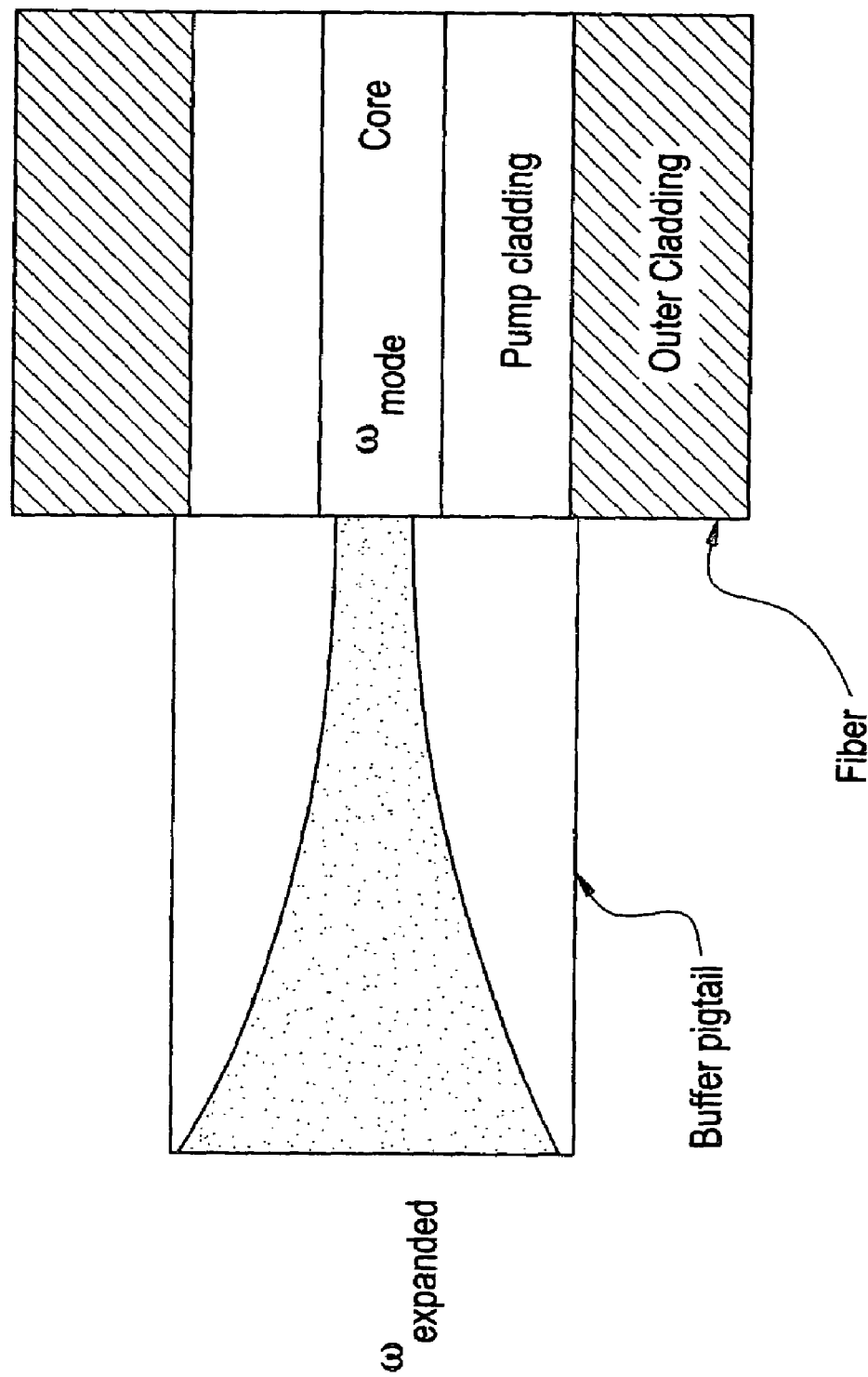

FIBER LASER SYSTEM WITH INCREASED OPTICAL DAMAGE THRESHOLD

This application is a continuation of application Ser. No. 11/141,704, filed Jun. 1, 2005, and is a continuation application of application Ser. No. 09/317,221, filed May 24, 1999 now abandoned, which is a continuation-in-part of application Ser. No. 09/116,241, filed Jul. 16, 1998 now U.S. Pat. No. 6,208,458.

FIELD OF THE INVENTION

This invention relates generally to laser systems having application to such fields as micro-machining, drilling and marking. A primary characteristic of these lasers is their high-powered short-pulsed output, which in, for example, an industrial application, preferably machines the surface of a target or workpiece by an ablation technique. The invention also relates generally to laser systems which can serve in replacement of more expensive Nd based lasers, such as diode-pumped Q-switched Nd:YAG lasers and other lasers using Nd-based materials.

BACKGROUND OF THE INVENTION

It has been known in the prior art to use pulsed laser systems to effect such processes as diverse as metal machining and biological tissue removal. Of chief concern in these systems is the amount of "collateral damage" to the surrounding regions of the workpiece, or, in the case of biological uses, surrounding tissues. In the case of the machining of metallic workpieces, for example, laser pulses greater than 100 microseconds in duration will machine the workpiece at the cost of creating a significant pool of molten liquid which is ejected from the beam impact site. Cleanly machined features cannot be obtained with this machining technique owing to the tendency of the molten material to spatter the workpiece and/or freeze and harden on the workpiece itself. This effect is due, of course, to the transfer of a significant amount of heat into the workpiece material at the target zone and at surrounding areas as well. In the case of biological procedures, this heat transfer effect typically causes unacceptable collateral damage to the surrounding tissues.

A general but partial solution to this problem resides in the use of shorter pulse durations. With shorter pulses the target is heated more quickly and thus reaches the evaporation point before significant liquid is permitted to form. Thus, in this arena, the shorter Q-switched temporal pulse may find advantage in certain applications. The pulse widths of conventional Q-switched, solid state lasers used in micro machining is approximately 50–200 nanoseconds. This pulse width has for many cases proven to provide a reasonable balance between laser cost, machining accuracy and collateral effects such as the size of the heat-affected zone (HAZ), it being generally understood that the cost of laser systems of significant power increases greatly with the shortness of the period of the output pulse.

However, even in the above mentioned pulse width range, the degree of heat transfer into the material is unacceptable for many applications. Recently developed lasers reported at OE/LASE SPIE vol. 2380 pp 138–143 (1995) which generate pulses in the 8–20 ns range abate this problem to a degree, however since the threshold for ablation in the nanosecond range decreases as the reciprocal of the square root of the laser temporal pulse width, it is apparent that as the pulsewidth is further reduced, the range of potential applications broadens considerably.

With advances in pulsed laser systems, lasers having pulse widths well into the femtosecond regime have become available. At these ultrashort pulse widths, collateral damage to surrounding regions becomes almost negligible, because of the lack of significant heat transfer into zones outside of the immediate target area. Essentially, the material at the target is substantially instantaneously vaporized while the fleeting duration of the impact of the laser energy substantially eliminates the possibility of heat transfer into surrounding areas. In general, it is known that the heat penetration depth L is proportional to the square root of the product of the heat diffusion coefficient (specific to the material) and the pulse width t. Consequently, as the pulse width becomes shorter, the heat penetration depth decreases proportionately. With femtosecond pulses, ablation thus takes place before significant heat can be transferred into the material, so that little or no heat effected zone (HAZ) is created. U.S. Pat. Nos. 5,656,186 and 5,720,894, incorporated herein by reference, discuss the above effects generally, and disclose laser systems operating well into the femtosecond regime in some instances.

However, as previously mentioned, the costs associated with femtosecond-regime micro-machining lasers are not insignificant; they presently cost five to fifteen times more than the present nanosecond-regime micro-machining sources. Thus, there is a need in the industrial and medical fields for a micro-machining or marking laser which reduces the collateral damage problems of the prior art, yet has a cost comparable to the present sources. This goal has been achieved through the present invention, which, through the use of a novel and highly efficient combination of Q-switching and Yb fiber laser techniques, provides a source operating in the short nanosecond or sub-nanosecond regime which is less expensive than the micro-machining sources now conventionally used, generating pulses as much as 4 orders of magnitude smaller than that in the known micromachining arts, and thus producing a greatly decreased heat affected zone which is practical for a wide variety of applications while avoiding the greatly increased cost of present femtosecond systems.

As mentioned above, Q-switching is currently a common technique for generating nanosecond optical pulses. It is known that the main parameter which determines the duration of a Q-switched laser pulse is the laser cavity round-trip time $T_{round-trip} = 2L_{cavity}/c$, where c is the speed of light and $L_{cavity}$ is the laser cavity length. Therefore, shorter laser cavity length is generally required for generating shorter Q-switched pulses. However, it is known that this shortening of the cavity length normally reduces the mode volume which makes if more difficult to achieve suitable pulse energies. Further amplification in a solid-state amplifier is usually not a practical solution due to the very low gain characteristic of solid-state amplifiers. Moreover, pushing the energies from a short pulse microchip laser sufficient for micromachining, reduces the microchip laser efficiencies to around 5%.

Here we demonstrate that by using a low energy microchip laser in conjunction with a highly efficient large core Yb fiber amplifier these problems can be overcome and sub-nanosecond optical pulses can be achieved at high pulse energies.

Known Nd: based lasers, in addition to being expensive, are less efficient compared to Yb-doped fiber amplifiers. For example, Nd:YAG lasers transform the diode pump power to optical output at approximately 50% efficiency. In contrast, Yb fiber amplifiers transform laser diode pump power to optical output with about 90% efficiency. This better efficiency leads to certain cost savings, especially when the comparison is based on cost per unit of output power.

The amplification of high peak-power and high-energy pulses in a diffraction-limited optical beam in single-mode (SM) optical fiber amplifiers is generally limited by the small fiber core size that needs to be employed to ensure SM operation of the fiber. To overcome the energy and peak power limitations, recently the use of multi-mode (MM) fiber amplifiers has been suggested (U.S. Pat. No. 5,818,630 to Fermann and Harter, herein incorporated by reference). In this work the loss of spatial beam quality in MM fiber amplifiers is prevented by excitation of the fundamental mode via the use of appropriate mode-matching bulk optics or fiber tapers as suggested in U.S. Ser. No. 09/199,728 to Fermann et al., herein incorporated by reference.

Particularly interesting are MM fiber amplifiers that are double-clad since they can be conveniently pumped with high-power diode lasers to produce high average powers. Moreover, the achievable small cladding/core ratio in double-clad MM fibers also allows the efficient operation of fiber lasers with small absorption cross sections, as suggested in the aforementioned U.S. Pat. No. 5,818,630 to Fermann and Harter.

Cladding-pumped fiber amplifiers and lasers have been known for many years. See U.S. Pat. No. 4,829,529 to J. D. Kafka, U.S. Pat. No. 4,815,079 to Snitzer et al., U.S. Pat. No. 5,854,865 to Goldberg, U.S. Pat. No. 5,864,644 to DiGiovanni et al., and U.S. Pat. No. 5,867,305 to Waarts et al. In the early work in this area (Kafka and Snitzer) only double-clad fiber amplifiers comprising a SM core were considered for cladding-pumping, resulting in obvious limitations for the amplification of high peak power pulses. Moreover, Snitzer et al. only considered double clad fibers with approximately rectangular-shaped or non-centrosymmetric cladding cross sections to optimize the absorption efficiency of such fibers. The use of relatively small cladding/core area ratios enabled by double-clad fibers with a large multi-mode core, however, allows for the efficient implementation of any arbitrary cladding cross section, i.e. circular, circular with an offset core, rectangular, hexagonal, gear-shaped, octagonal etc. The work by Kafka was equally restrictive in that it only considered double-clad fibers with a single-mode core pumped with coherent pump diode lasers. Again the use of relatively small cladding/core area ratios enabled by double-clad fibers with a large multi-mode core enables the efficient implementation of pump diode lasers with any degree of coherence.

The later work of Goldberg and DiGiovanni was not necessarily restricted to the use of double-clad fibers with SM fiber cores. However, none of the work by Goldberg and DiGiovanni (or Kafka, Snitzer or Waarts et al.) considered any technique for the effective use of multi-mode double-clad fibers as diffraction-limited or near diffraction-limited high-power amplifiers. No methods were described for exciting the fundamental mode in multi-mode amplifiers, no methods were described for minimizing mode-coupling in multi-mode amplifiers and no methods were described for controlling the excitation and the size of the fundamental mode by gain-guiding or by the implementation of an optimized distribution of the dopant ions inside the multi-mode fiber core.

Moreover, the specific pump injection technique suggested by DiGiovanni comprises built-in limitations for the efficiency of fundamental-mode excitation in multi-mode fiber amplifiers. DiGiovanni considers a fused taper bundle with a single-mode fiber pig-tail in the center of the bundle, which is then spliced to the double-clad amplifier fiber to simultaneously deliver both the pump light (via the outside fibers of the fused taper bundle) and the signal light (via the single-mode fiber pig-tail) to the amplifier fiber. Due to the limited packing ability of circular structures, air gaps remain in the fiber bundle before tapering. Once tapered, surface tension pulls all the fibers in the fiber bundle together, essentially eliminating the air gaps (as discussed by DiGiovanni et al.). As a result the outside cladding of the taper bundle becomes distorted (resulting in a non-circular shape with ridges where the fibers were touching and with valleys where there were air-gaps). Hence the central core region and the fundamental mode also become distorted which limits the excitation efficiency of the fundamental mode in a MM fiber when splicing the fiber bundle to the double-clad fiber. In fact any geometric differences in the cladding shape of the fiber bundle or the double-clad fiber will lead to a limited excitation efficiency of the fundamental mode in the MM fiber in the process of splicing.

For reducing size and cost of the system as well as for increasing efficiency of the amplification side-pumping (as described in aforementioned U.S. Pat. No. 5,818,630) rather than end-pumping might be advantageous. For the benefits of fiber reliability the use of fiber couplers is preferred. The use of fiber couplers for pump light injection into MM fibers is discussed in aforementioned U.S. Ser. No. 09/199,728.

Normally for many applications a single polarization is desirable, so the use of polarization preserving fiber is desirable. There are several means of making polarization preserving fiber. However, for multimode fiber, elliptical core fiber is the easiest to manufacture and to obtain at this time.

Another attractive feature would be ease of fiber coupling the laser to the application, by using the amplifier fiber as the fiber delivery system, or a multimode undoped fiber spliced to the end of the amplifier fiber. This is similar to the fiber delivery system described in U.S. Pat. No. 5,867,304 and its progeny, herein incorporated by reference, where a multi-mode fiber is used for delivery of a single mode beam. The purpose is to lower the intensity in the fiber by using the larger effective mode-field diameter. This allows higher peak powers; >1 KW pulses can be transmitted without the onset of nonlinear processes. In U.S. Pat. No. 5,867,304, this fiber is used with ultrashort pulses where the fiber dispersion distorts the pulses. However, with nanosecond pulses, dispersion has a negligible effect on the pulse width so dispersion compensation is not necessary.

SUMMARY OF THE INVENTION

According to the invention, the goals set out in the foregoing are achieved through the use of a miniature Q-switched pulse source which is coupled to a doped Yb fiber laser which obtains single mode amplification in a multi mode fiber. Short pulse duration, efficiency, high power, high energy, cost efficiency and compactness are essentially achieved through the use of the combination of a compact diode-pumped microchip laser and a specially designed diode-pumped fiber amplifier. Short duration is achieved through the short cavity length of a microchip laser, whereas high efficiency is achieved through the use of a Yb-doped fiber amplifier pumped at ~980 nm. High power is achieved through cladding pumping geometry, and large fiber core (high core to cladding ratio).

High energy is achieved through a number of design features: the large core, with single mode excitation and propagation, allows a large cross-sectional area and, consequently, permits relatively low peak intensities and high saturation energies. Further, the large core provides a good core-to-cladding ratio, which in conjunction with the high doping level available for Yb significantly reduces the pump absorption length and allows for short amplifier lengths (0.1 to ~2 m), thus reducing detrimental nonlinear effects in the fiber without compromising power and energy extraction efficiencies. For very large cores, direct in-core pumping can be used. Side pumping provides higher power extraction efficiency and shorter interaction length compared to copropagating geometries (along with pump diode protection). Pigtailing of the fiber ends increases the surface damage threshold and allows a significant increase in output pulse energies and powers, while a composite core allows the robust coupling of the microchip seed pump into a fundamental mode of the fiber core. This also permits use of a non-perfectly-gaussian input beam from the microchip laser.

BRIEF DESCRIPTION OF THE DRAWINGS

FIG. 3 illustrates the temporal profile of the output of the lasers of FIGS. 2 and 2a; and FIGS. 4 and 4a, where FIG. 4 is presented as an inset in FIG. 1, illustrate a fiber-end coupling and optical damage avoidance technique.

DETAILED DESCRIPTION OF THE PREFERRED EMBODIMENTS

Figure 1:
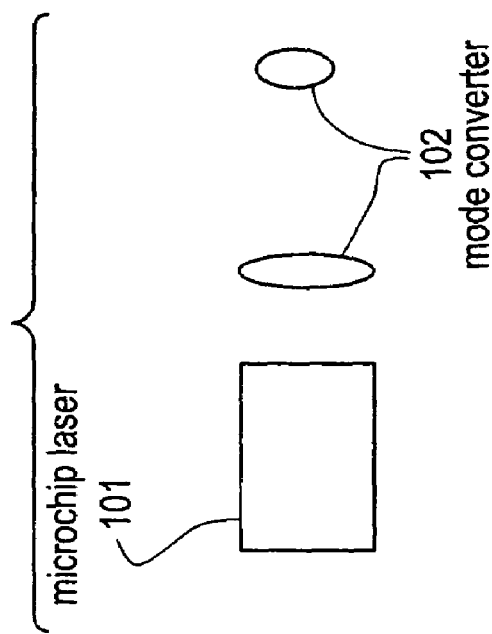
FIG. 1 is a schematic layout of the laser system of the invention.

FIG. 1 illustrates the system configuration of the laser according to the present invention. In this Figure, reference numeral 101 indicates a microchip laser source, illustrated in greater detail in FIGS. 2 and 2(a). It should be noted that, as used herein, the term "micro chip laser" refers to a laser of small device size, where at least some of the components, such as the gain medium and the end mirror, are monolithic. In this specification, the terms "microchip laser" and "microlaser" are used interchangeably to refer to a laser having these characteristics. As described in detail below, the micro chip laser 101 according to the invention is an actively Q-switched laser which is typically diode pumped.

In order to achieve excitation of only the fundamental mode in a multimode-core fiber amplifier, the beam waist $\omega_{input}$ of a mode coupled into the amplifier from a microchip laser has to approximately match the beam waist $\omega_{mode}$ of this fundamental mode: $\omega_{input} \approx \omega_{mode}$. Note, that for the step-index fiber $\omega_{mode} = 0.7\ r_{core}$, where $r_{core}$ is the radius of a fiber core. Therefore, the output of the microchip laser 101 has to be directed into the fiber amplifier input (FIG. 4) through properly designed mode-matching optics 102. The essential function of this mode-matching optical arrangement is to transform the mode size of an optical beam at the output of a microchip laser $\omega_{output}$ into the proper beam size $\omega_{input}$ at the input of the fiber amplifier. This imaging function can be achieved by a variety of optical arrangements, one example of which is schematically represented in FIG. 1. Note that the focusing lens in this arrangement is also used to focus the pump light from a laser diode, and that it is essential for our invention to achieve focusing of these two input beams at two different planes, as described below.

The inventors have determined experimentally that limitations on the maximum extractable energies in a fiber amplifier originate from a number of effects, two significant ones being the Raman gain and surface damage at the input and output facets of the fiber core.

The optical damage threshold at the surface of a glass is characterized by the optical intensity $I_{th}^{damage}$ of an optical beam at this surface. Generally, this threshold intensity is determined by the type of material used and by its surface quality. It also depends on the duration of the pulse and average power (repetition rate) of the pulse train. As is known, the threshold intensity for optical damage in the nanosecond range decreases as the reciprocal of the square root of the laser temporal pulsewidth: $I_{th}^{damage} \propto 1/\sqrt{T_{pulse}}$.

Figure 4:
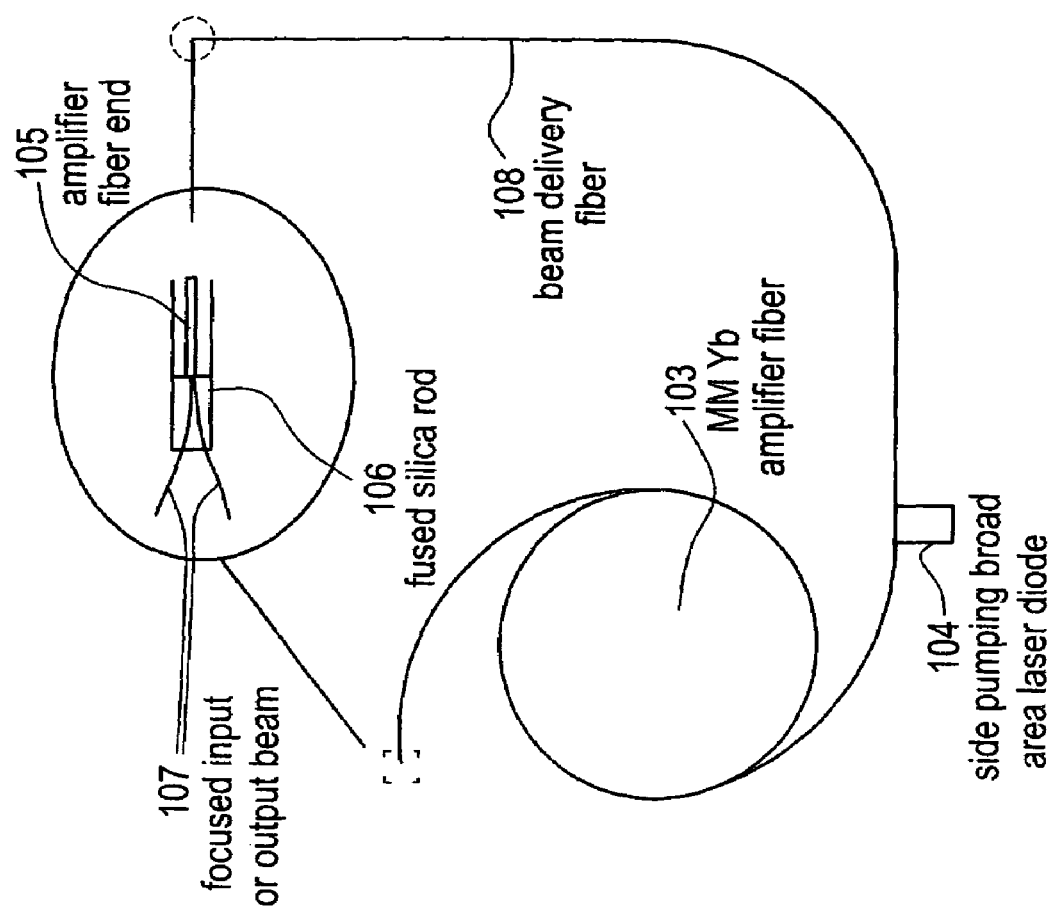

The inventors have demonstrated that the optical surface damage threshold can be significantly increased by using a beam expansion technique, as shown schematically in FIG. 4 and in greater detail in FIG. 4a. Here, the fiber-end is bonded to a buffer of the same material as the fiber. At the end surface, the optical beam will be expanded to $\omega_{expanded}$ according to:

$$\omega_{expanded} = \omega_{mode}\sqrt{(1+2L/\omega_{mode}^2 k)}$$

Here, $k = 2\pi n/\lambda$, n is the glass refractive index, $\lambda$ is the wavelength of the amplified signal and L is the thickness of the buffer. It is critical that the quality of the bond between the surfaces of the fiber and the buffer be sufficiently high to eliminate any optical interface, and, thus, to eliminate surface damage at this surface. Various known bonding techniques can be used to achieve this quality. In the present case, a silica-glass rod of the same diameter as the outer diameter of the pump-cladding was spliced to the end of the fiber. The maximum improvement η of the damage threshold is determined by the square of the ratio between the radius of the buffer rod $R_{buffer}$ and the size of the core mode $\omega_{mode}$: $\eta = (R_{buffer}/\omega_{mode})^2$. In the case of a 50 micron core and a 300 micron buffer pigtail as used in our experimental configuration the improvement was found to be ~70 times. Such buffer-pigtail protection is required for both input and output ends of an amplifier. In the case signal and pump beams are entering the same end of a fiber (copropagating configuration) the incoming laser beam has to be focused on the end of the fiber, as shown in FIG. 4a, inside the bonded buffer, where there is no interface. If the bonded buffer is a coreless rod of the same diameter as fiber-amplifier inner cladding (pump cladding), as shown in FIG. 4a, the pump beam should be focused at the entrance facet of this silica rod. Note, that generally this buffer can be a slab with transverse dimension much larger than the pump cladding. In this case pump beam could be directly focused into the pump cladding. In the case side pumping is used via a V-groove or a fiber pigtail the corresponding element can be either placed directly in the fiber amplifier after the buffer bonding point, or (if a silica rod is used as a buffer) in this coreless pigtail.

The Raman effect causes the spectrum of the amplified pulse to shift towards the longer wavelengths and outside the amplification bandwidth of the Yb-fiber amplifier. Raman effect onset is characterized by a threshold intensity $I_{th}^{Raman}$ in the fiber core which, as is known in the prior art, is inversely proportional to the effective propagation length $L_{eff}$ of an amplified pulse and the Raman gain coefficient: $I_{th}^{Raman} \propto 1/L_{eff} g_{Raman}$. Since the Raman gain coefficient is determined by the fiber glass properties, in order to maximize extractable peak powers and, hence, pulse energies, one has to increase the core size and decrease the interaction length. The interaction length can be reduced by using fibers with high doping level which lowers the fiber length, propagating amplified pulses opposite to the direction of the pump beam which lowers the pulse energy until the end of the fiber where the gain will be higher. Also, use of multimode large core fibers in the double clad configuration facilitates pump absorption and allows shorter amplifier lengths.

It is important to note that for certain applications the presence of strong Raman components in the amplified pulses does not reduce the usability of these pulses. One example is laser marking. The inventors demonstrated experimentally that surface marking is not sensitive to the Raman spectral shift and there is no degradation in the marking quality even for pulses with only a small fraction of the total energy in non-Raman shifted spectral components. In one specific example, this allowed use of ~150 µJ of total pulse energy vs ~40 µJ that was available without Raman shifting. Thus, for this type of application significantly higher energies are available from this particular fiber amplifier.

However, many applications are sensitive to the presence of the Raman shift. For example, when wavelength shift is required prior to end use, via second-harmonic or other frequency conversion methods, the Raman component would significantly reduce the efficiency of this conversion and would produce large amplitude fluctuations. For such applications, a number of existing techniques currently employed in fiber telecommunication systems (See, OFC'95 Tutorial Session) could be used for Raman-effect reduction in the fiber amplifiers, in addition to the methods described in this invention for optimizing fiber amplifiers in order to minimize their susceptibility to Raman effect.

The fiber amplifier 103 is a Yb-doped large-core cladding-pumped fiber amplifier. The core diameter of this fiber is approximately 10 micrometers −1 mm in diameter and thus is a true multimode fiber. However, this multimode fiber performs single mode amplification using the techniques described in U.S. Pat. No. 5,818,630, herewith incorporated by reference.

Reference numeral 104 illustrates the pump for the Yb multimode fiber laser. The pump is advantageously configured as a side-pumping broad area laser diode, the details of which are well known in the art. The Yb fiber amplifier can transform the pump power into an optical output with an extremely high efficiency of 90%. In addition, the multimode Yb amplifier fiber produces an output which is higher by more than an order of magnitude over that obtainable with a corresponding conventional single mode fiber amplifier. The combination of extremely high efficiency and high gain allows the source microchip laser to operate in a relatively low energy, higher efficiency regime with little input power.

Figure 2:
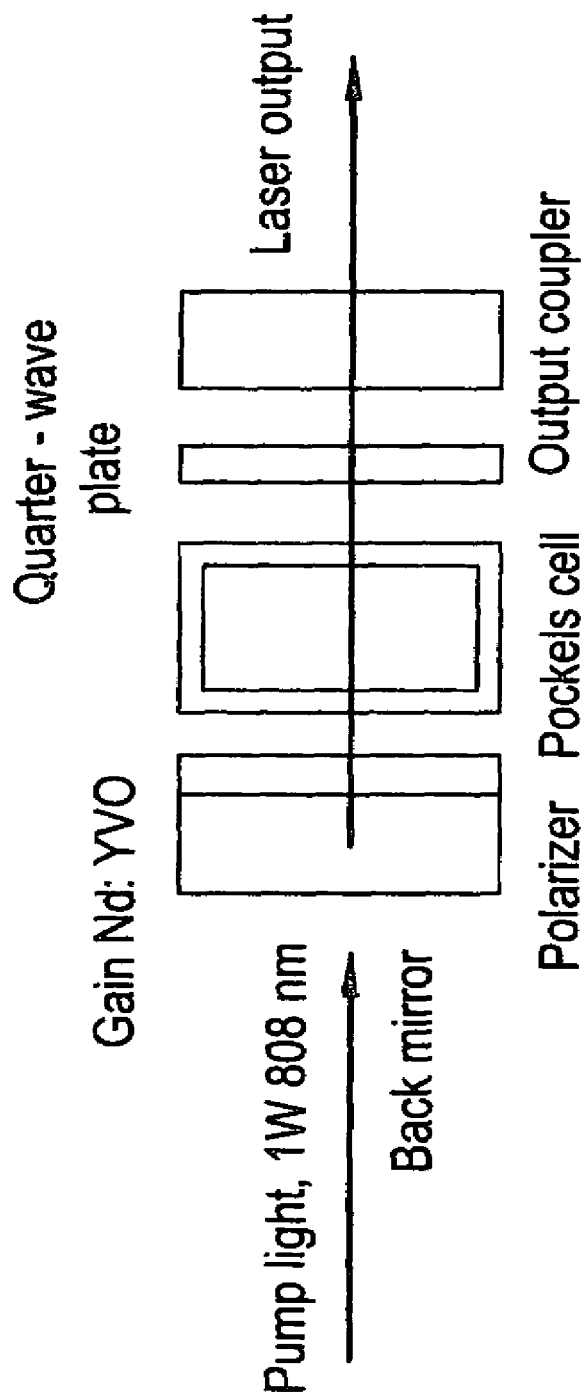
FIG. 2 illustrates schematically one actively Q-switched micro-laser according to the invention.
Figure 2A:
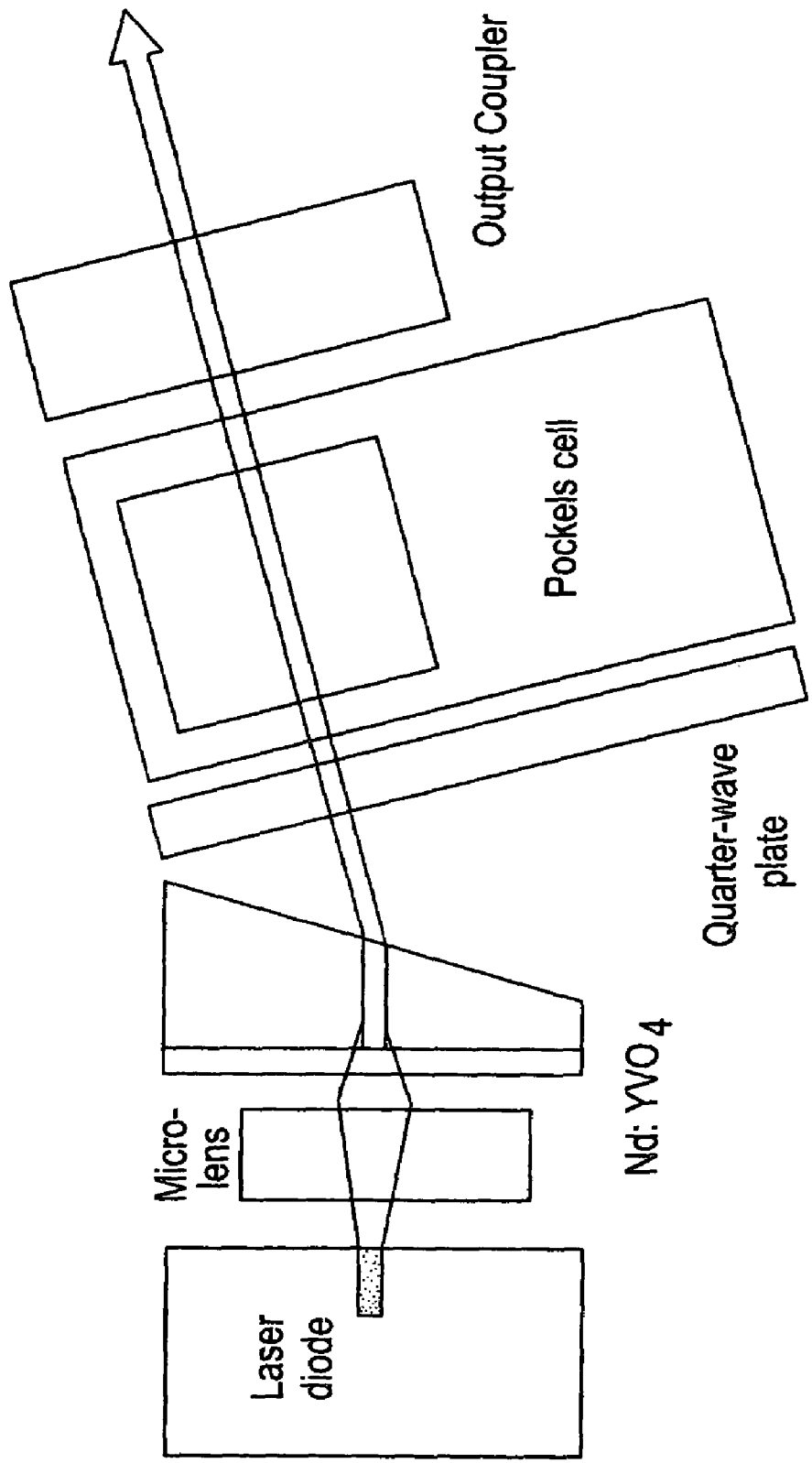
FIG. 2a illustrates a typical layout of the actively Q-switched micro chip laser.

FIGS. 2 and 2(*a*) illustrate two preferred embodiments of the micro-laser or microchip laser used according to the invention. These devices are extremely compact, simple, inexpensive and have low power requirements, yet produce extremely short high peak power pulses. According to the invention, the microlasers employed are diode pumped lasers which are actively Q-switched. A primary advantage of these miniature lasers is that they readily provide output laser pulses of very short duration as a consequence of their short laser cavities. Active Q-switching gives good control over the repetition rate and the number of pulses delivered at a time, which is useful in marking and micromachining applications.

The microchip laser is a solid-state device designed to provide nanosecond laser pulses at 1064 nm wavelength. Diode pumping enables high pump-to-laser efficiency, compact design, and reduced thermal problems in the gain material. The cavity is designed to provide the shortest possible pulse duration achievable with active Q-switching with moderate (3 micro J) pulse energy.

Two representative laser cavity designs are shown in the Figures. The gain material is Nd doped Yttrium Orthovanadate ($Nd:YVO_4$) at 1% doping level. It is cut and oriented in a way (a-cut) to provide maximum absorption at the pump wavelength. In addition, the crystal is wedge shaped in FIG. 2a, which allows the laser to operate only in one linear polarization. The crystal is pumped longitudinally through its coated dichroic dielectric mirror surface 201. The pump laser 203 is a 100 micron wide laser diode with 1 Watt cw pump power. The coating 201 provides passage of pump light at 808 nm and reflection of laser light at 1064 nm. This surface acts also as a laser cavity mirror. The laser has a flat output coupler. Some thermal focusing in the cavity tends to stabilize the laser cavity mode, but it is basically an unstable resonator.

Figure 3:
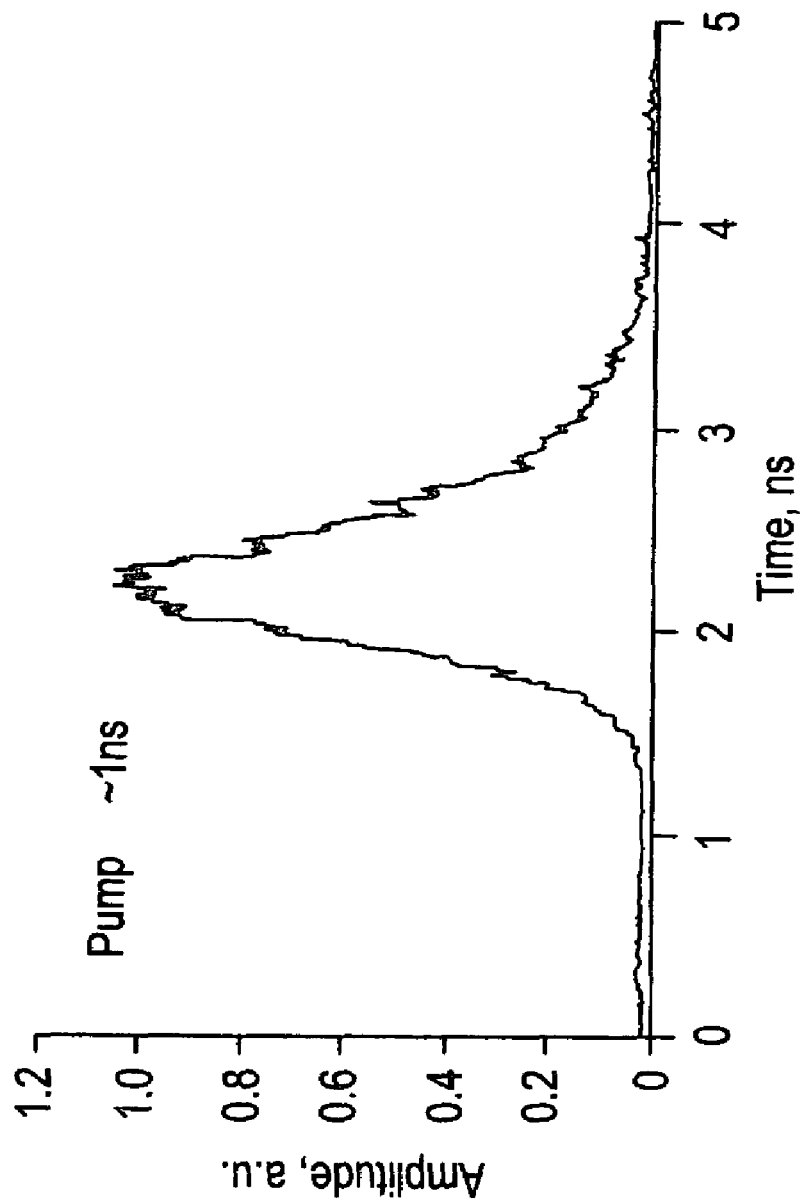

A Pockels cell 207 and a quarter-wave plate 209 inside the cavity form an electro-optic Q-switch. The Pockels cell is made of $LiNbO_3$, in the transversal field configuration. The Pockels cell at the off state has zero retardation. The quarter-wave plate provides a static half wave retardation of light in a round trip, which means changing the polarization of light inside the cavity. This opposite polarization is then deflected out of the cavity (FIG. 2a) by the wedge shaped gain material acting as a polarizer, or a polarizer is placed inside the cavity (FIG. 2). The laser is in the static off state with the voltage off at the Pockels cell. When the gain material is pumped continuously, the pump energy is stored in the gain material for approximately 100 microseconds, the fluorescence lifetime of the gain material. To Q-switch the laser, a fast, 2.5 ns rise time high voltage pulse (1200 V) is applied to the Pockels cell. The voltage on the Pockels cell introduces a quarter-wave retardation, which compensates the retardation of the wave plate. The intra-cavity laser field then builds up unimpeded until it finally reaches saturation by depleting the gain. The laser pulse leaves the cavity through the output coupler 211, which has 70% reflectivity and 30% transmission. The resulting laser pulse has 750 ps pulse duration and 3 micro J energy (FIG. 3). A solid-state driving electronics circuit provides the fast, high voltage switching pulses for the Pockels cell with a repetition rate up to 15 kHz. To operate the laser as a cw source a static voltage can be applied to the Pockels cell.

Single longitudinal mode operation is often desired in lasers. Besides the favorable spectral properties to the laser, single-mode operation reduces the timing jitter. In single longitudinal mode operation there is no mode competition and gain cross-saturation between modes. As a result, the uncertainty of the turn-on time of the laser relative to the trigger pulse, the jitter, is reduced. Timing jitter of less than 100 ps is obtained when the laser operates in single mode.

The laser cavity is designed for single-longitudinal-mode operation. For long term stability it is particularly important that the laser cavity is stabilized against temperature induced changes. The cavity is designed so that temperature induced effects do not cause mode-hopping in the laser. The mechanical and optical construction of the laser is such that the thermal expansion of the base whereon the laser in mounted compensates for the thermal effects in the materials. In addition to thermal expansion, further consideration was given to high thermal conductivity and good electrical and mechanical properties of the base material, which enables temperature stabilization of the components.

Because the length of the resonator is approximately 8 mm, the laser can support 4 to 6 longitudinal modes at this cavity length. To achieve single mode operation we employed a resonant reflector etalon output coupler. The use of an resonant reflector etalon to maintain single mode operation is described in Koechner pp. 242–244. The output coupler is a solid Fabry-Perot etalon working in the reflection mode. Its reflectivity R is modulated as a function of wavelength. The maximum value of reflectivity occurs at the resonant wavelengths given by $$\delta_{etalon}/2\pi = m, \quad (1)$$

where $\delta_{etalon}$ the phase difference between interfering optical beams in the etalon at consecutive reflections m is a half integer number (m=½, 3/2, 5/2, ...).

On the other hand, resonant wavelengths of the laser cavity are determined by the total optical phase difference between beams of consecutive reflections inside the cavity, $\delta_{cav}$, $$\delta_{cav} = 4\pi\Sigma(n_i l_i)/\lambda$$

The summation takes into account all the optical materials; gain material, Pockels cell, polarizer and quarter-waveplate material and air with their respective optical thickness $n_i\, l_i$. The resonant condition for the cavity is $$\delta_{cav}/2\pi = n, \quad (2)$$

where n is an integer value (n=1, 2, 3, ...). Lasing occurs essentially when the resonant wavelength of the output coupler etalon coincides with the resonant wavelength of the laser resonator cavity. This is given by simultaneous satisfaction of the above half-integer and integer conditions for m and n respectively. The number of allowable modes under the gain profile can be restricted to 1 by proper choice of the output coupler etalon. In our embodiment of the microlaser a single uncoated $LiNbO_3$ plate of 1 mm thickness provides sufficient mode selectivity to allow the laser to operate in a single longitudinal mode.

The resonance conditions (1) and (2) are temperature dependent, since the thermal expansion and the thermal change of the refractive index changes the optical pathlength in the laser cavity and in the resonant reflector output coupler. These effects combine to shift the resonance peaks of the resonant reflector and the laser cavity. We have a limited choice of the optical materials from which the laser is constructed. Their thermal expansion constants and thermal induced refractive index coefficients determine the thermal change of resonance conditions, which in general results in a mismatch of resonances (1) and (2) as the temperature changes and causes mode hopping of the laser. The thermal expansion of the base on which the laser is constructed also contributes to the change of the wavelength of the laser. We have a rather free choice of the base material. By using Aluminum Nitride ceramic as the laser base we achieved that the thermal shift of the laser wavelength was matched to the thermal shift of the resonance condition of the resonant reflector output coupler and mode hopping has not occurred within a 4 degree C. temperature interval. Temperature stabilization of the laser cavity within 1 degree C. resulted in continuous single longitudinal mode operation of the laser.

An alternative source may be a passively Q-switched microchip laser, which can be very inexpensive and may be preferred in some cases for this reason. The primary reason to use a miniature source is to keep the laser cavity short which reduces the pulse width of the laser.

The miniature laser is coupled to a doped fiber gain medium. In the invention this medium is a Yb:fiber.

In order to reach higher peak powers, the invention utilizes a multi-mode fiber to propagate single mode pulses as described in U.S. Pat. No. 5,818,630. As described above a mode converter is used to convert the single mode input to excite the fundamental mode of the multimode fiber. The mode converter 102 used in this case is a combination of lenses which mode-matches the output of the microchip laser to the beam diameter for single mode excitation of the multimode fiber. In addition to the lenses for mode-conversion, gain guiding in the Yb:fiber can be used to relax the tolerances on mode matching. Without gain in the Yb fiber, robust fundamental-mode excitation becomes increasingly difficult to achieve for the increasing core size of a fiber amplifier. We found experimentally that it is particularly advantageous to employ specially designed fibers in which Yb-doping in the center of the core has a significantly smaller diameter than the core itself. In this case, the fundamental mode light experiences significantly higher gain than multimode light. In our experimental configuration, we used 50 μm diameter core with 25 μm diameter doped region in the center, which exhibited a significantly more robust performance compared to 25 μm homogeneously doped core. Besides relaxing the alignment tolerances, the beam parameters of the source are also relaxed. As the microchip laser may not have a perfect diffraction limited beam output, gain guiding can be used to correct for this. Also, gain guiding can correct the distortion expected from DiGiovanni pump couplers.

The Yb fiber in this example had a 300 μm outer diameter and a 50 μm core. The use of relatively small cladding/core area ratios enabled by double-clad fibers, together with a large multi-mode core, allows for the efficient absorption of the pump with, for example, a gear-shape cladding cross section. The resultant Yb amplifier can be as short as 1.5 M long, as compared to 5–40 M which would be required of a typical single mode Yb amplifier.

Another advantage of this optical source is the ease of adding a multimode fiber delivery system which propagates a single-mode. In many applications fiber delivery is very important, such as in surgery, dentistry and marking in confined spaces. An example of marking in confined spaces is the marking of assembled automotive or other parts for antitheft purposes.

An additional advantage of the shorter pulse is that nonlinear processes for frequency conversion are more efficient with the higher peak powers which come from shorter pulses with similar energies. For certain applications where wavelength conversion is necessary, for example in UV-range radiation for via hole drilling, the output of the laser must be frequency tripled to create the UV radiation. This source, could, for example, replace frequency tripled Q-switched Nd:YAG lasers and eximer lasers for this application.

Another application where frequency conversion is important is dentistry. For example, in U.S. Pat. No. 5,720,894, it is described that UV radiation performs relatively damage free material removal by hard tissue ablation primarily due to the stronger absorption of that wavelength regime. Three preferred wavelengths for applications in medicine and dentistry are 2.1 μm, 2.9 μm and 1.55 μm. Like UV radiation, the preference is due to the strong absorption coefficient of biological tissues at these wavelengths.

The most straight forward means for generating 1.55 μm radiation is to use a laser source which emits at 1.55 μm and a doped fiber which amplifies 1.55 μm radiation. A microchip laser which emits 1.55 μm radiation is known, and described in Thony et al. It is well known that erbium fiber amplifies 1.5 μm radiation. An alternative source could be a compact erbium doped waveguide laser as described in; H. Suche, T. Oesselke, J. Pandavenes, R. Ricken, K. Rochhausen, W. Sohler, S. Balsamo, I. Montrosset, and K. K. Wong "Efficient Q-switched Ti;Er:LiNbO$_3$ waveguide laser", Electron. Lett., Vol. 34, No. 12, 11 Jun. 1998, pp 122–1230.

Another alternative is to use a laser source which emits a different wavelength, such as that of the invention, and use a frequency conversion step to generate the 1.5 μm radiation. Examples of a nonlinear conversion step at the output include doubling, tripling, quadrupling, Raman shift, OPO, OPA or OPG. To generate 1.55 μm radiation, converting a 1.06 source in a PPLN OPG is quite convenient.

In order to generate other wavelengths such as 2.1 and 2.9 μm similar methods can be applied to this laser concept.

The multimode amplifier of the invention can also amplify a cw source or operate as a cw source. For example, a marking laser often has the option of being operated in a cw mode for generating more of a heat type mark. For the design of high-power cw lasers the use of MM fibers is advantageous as the reduced cladding/core area ratio reduces the absorption length in such structures. For very high cw laser powers, nonlinear effects can indeed occur and thus MM fibers can be used for the construction of compact ultra-high power cw fiber lasers. The MM fibers can then be effectively used for the pumping of fiber Raman amplifiers or for the construction of Raman lasers operating at wavelength regions shifted away from the gain band of the doped fibers.

As previously indicated, a number of major advantages are achieved according to the invention by employing the combination of a Q-switched microchip laser and a Yb: fiber amplifier. Because of the efficiency and gain of the Yb fiber amplifier, the output power of the microchip laser need not be large. The peak power of this amplifier is limited by nonlinear effects in the fiber and by the optical damage thresholds primarily at the fiber ends. The delivery fiber may be a simple multimode undoped fiber spliced to the end of the amplifier fiber, or the amplifier 103 can itself constitute the fiber delivery system. Thus, a simple, inexpensive laser system suitable for a wide variety of applications can be efficiently produced.

What is claimed is:

1. A fiber amplifier system, comprising:
   an optical fiber termination and mode matching system for increasing an optical damage threshold at one or both ends of the fiber amplifier, comprising:
   a termination that provides a transition from fiber propagation to free space propagation, wherein said termination comprises an optical element bonded to at least one end of the fiber, and having a diameter at least as great as that of an inner cladding of the fiber;
   a pump beam being input into said fiber amplifier at a first location; and
   a signal beam being input into said fiber amplifier at a second location.

2. A system as claimed in claim 1, wherein said signal beam is input into said fiber amplifier by being focused at or near an end surface of said fiber.

3. A system as claimed in claim 1, wherein said pump beam is input into said fiber by being focused onto said inner cladding of said fiber.

4. A system as claimed in claim 1, wherein said optical element is a coreless rod of like diameter as said inner cladding of said fiber.

5. A system as claimed in claim 1, wherein said optical element is of a same material as said fiber.

6. A system as claimed in claim 5, wherein said optical element is a buffer pigtail.

7. A system as claimed in claim 1, wherein said optical element is a coreless silica glass rod, and said pump beam is focused at an entrance facet of said rod.

8. A system as claimed in claim 1, wherein said optical element is formed as a slab having a transverse dimension of greater diameter than said inner cladding.

9. A system as claimed in claim 2, wherein said focusing is performed by mode converting optics which reduces a beam waist to a value approximating a beam waist of a fundamental mode in a core of said fiber amplifier, to excite the fundamental mode in said fiber amplifier.

10. A system as claimed in claim 1, wherein said end is an exit end of said fiber, and light passing through said optical element undergoes beam expansion.

11. A system as claimed in claim 1, wherein said signal beam is input into said fiber amplifier by being coupled into said fiber amplifier so as to excite the fundamental mode in said fiber amplifier.

12. A system as claimed in claim 11, wherein said fiber amplifier has a multimode core.

13. A system as claimed in claim 11, wherein said fiber amplifier has a core diameter between 10 micrometers and 1 millimeter.

14. A system as claimed in claim 11, wherein said fiber amplifier has a core diameter of around 50 micrometers.

15. A system as claimed in claim 1, wherein said pump beam is input into said fiber by being side-coupled into said inner cladding of said fiber.

16. A system as claimed in claim 11, wherein said fiber amplifier has an outer diameter of around 300 micrometers.

17. An optical fiber termination and mode matching system for increasing an optical damage threshold at fiber ends, comprising:
   a termination that provides a transition from fiber propagation to free space propagation, wherein said termination comprises an optical element bonded to each end of the fiber, and having a diameter at least as great as that of an inner cladding of the fiber;
   a beam being focused at a first location relative to said optical element and said fiber; such that a beam waist of said beam is reduced to a value approximating a beam waist of a fundamental mode in a core of said fiber, said fiber being multimode fiber; and
   said optical element permitting beam expansion at an exit end of said fiber.

18. A fiber optical system, comprising:
   an optical fiber termination for increasing an optical damage threshold at fiber ends, wherein said termination provides a transition from fiber propagation to free space propagation, and said termination comprises an optical element bonded to ends of the fiber, and having a diameter at least as great as that of an inner cladding of the fiber; and being of a same material as that of said fiber;
   said optical element permitting beam expansion at an exit end of said fiber.

19. An apparatus as claimed in claim 18, further including mode converting optics at an input end of said fiber for reducing a beam waist of an incoming beam to a value approximating a beam waist of a fundamental mode in a core of said fiber, for exciting a fundamental mode in said fiber, said core being a multimode core.

20. An optical fiber termination for increasing an optical damage threshold at fiber ends, comprising:
    an optical element bonded to ends of the fiber, and having a diameter at least as great as that of an inner cladding of the fiber; and being of a coreless silica rod construction;
    said optical element permitting beam expansion at an exit end of said fiber;
    wherein said termination provides a transition from fiber propagation to free space propagation.

21. An apparatus as claimed in claim 20, further including mode converting optics at an input end of said fiber for reducing a beam waist of an incoming beam to a value approximating a beam waist of a fundamental mode in a core of said fiber for exciting a fundamental mode in said fiber, said core being a multimode core.

22. A multimode amplifier, comprising:
    a multimode fiber having a core region and a cladding region; and input and output ends; and
    an optical element bonded to said input and output ends, and configured to increase an optical damage threshold of said multimode fiber by permitting beam focusing and expansion at said input and output ends, respectively.

23. A fiber amplifier, comprising:
    a fiber having at least a cladding region; and input and output ends; and
    an optical element bonded to said input and output ends, and configured to increase an optical damage threshold of said fiber by permitting beam focusing and expansion at said input and output ends, respectively.

24. A high power fiber amplifier, comprising:
    a fiber having at least a core region and a cladding region; and input and output ends; and
    a coreless rod bonded to said input and output ends, and having a diameter at least as large as that of said cladding region, and being configured to increase an optical damage threshold of said fiber by permitting beam focusing and expansion at said input and output ends, respectively.

25. Apparatus as claimed in of claim 1, wherein said bonding is sufficient in quality to prevent optical damage at the interface for pulse energies greater than 40 microjoules, and pulse lengths up to and including the nanosecond regime.

26. A fiber amplifier, comprising:
    at least one core and one cladding region with different diameters;
    an optical fiber termination and mode matching system for increasing an optical damage threshold at one or both ends of said fiber amplifier, comprising:
    a termination that provides a transition from fiber propagation to free space propagation, wherein said termination comprises an optical element bonded to at least one end of the fiber, and having a diameter substantially larger than said core region of said fiber;
    a pump beam being input into said fiber amplifier at a first location; and
    a signal beam being input into said fiber amplifier at a second location.

27. A fiber amplifier as claimed in claim 26, wherein an end face used for the extraction of optical energy from said fiber amplifier has a transverse cross section which differs from the transverse cross section at fiber locations remote from said end face, the diameter of said extracted optical beam at said at least one fiber end face being larger than the diameter of said fiber core.

28. A fiber amplifier as claimed in claim 26, said amplifier further containing at least one end face used for the extraction of optical energy from said fiber amplifier, said optical energy being contained in a beam of a certain diameter;
    the diameter of said extracted optical beam at said at least one fiber end face being larger than the diameter of said fiber core;
    said increase in diameter at said fiber end face functioning to increase said optical damage threshold of said fiber amplifier.

* * * * *